United States Patent [19]

Colbert et al.

[11] Patent Number: 5,213,548

[45] Date of Patent: May 25, 1993

[54] GEAR SHIFTING SYSTEM FOR DERAILLEUR EQUIPPED BICYCLE

[76] Inventors: Ralph G. Colbert, 19720 Mildred Ave., Torrance, Calif. 90503; George Kerster, 450 N. Meadows Ave., Manhattan Beach, Calif. 90266; Thomas A. Nussmeier, 12593 Westmont Dr., Moorpark, Calif. 93021

[21] Appl. No.: 844,740

[22] Filed: Mar. 2, 1992

[51] Int. Cl.⁵ .......................................... F16H 63/00
[52] U.S. Cl. ........................................ 474/71; 474/81; 474/103; 474/110; 280/238; 364/426.04
[58] Field of Search ....................... 474/70, 71, 80, 81, 474/101, 103, 110; 280/261, 236; 364/426.04; 475/297, 299; 180/206

[56] References Cited

U.S. PATENT DOCUMENTS 3,919,891 11/1975 Stuhlmuller et al. .............. 474/81 X
5,059,158 10/1991 Bellio et al. ....................... 474/80 X Primary Examiner—Thuy M. Bui
Assistant Examiner—Roger L. Schoeppel
Attorney, Agent, or Firm—Irving Keschner

[57] ABSTRACT

A gear shifting system for use on a derailleur equipped bicycle having automatic and manual modes of operation. A microcontroller is mounted to the bicycle frame. Sensors are also mounted to the frame to allow the microcontroller to determine the most efficient gear ratio based on the bicycle velocity and the user pedaling rate in the automatic mode of operation. Servomotors mounted to the bicycle frame are responsive to the outputs to drive the bicycle derailleur and provide the most efficient gear ratio. A control panel mounted to the bicycle handlebars allows the user to select either the automatic or manual operating mode, the latter allowing manual activation of the gear shifters through the microcontroller and servomotors. The microcontroller has at least two input capture functions responsive to bicycle velocity and the cadence, in the automatic mode, and two output compare functions which adjust the derailleurs accordingly.

15 Claims, 9 Drawing Sheets

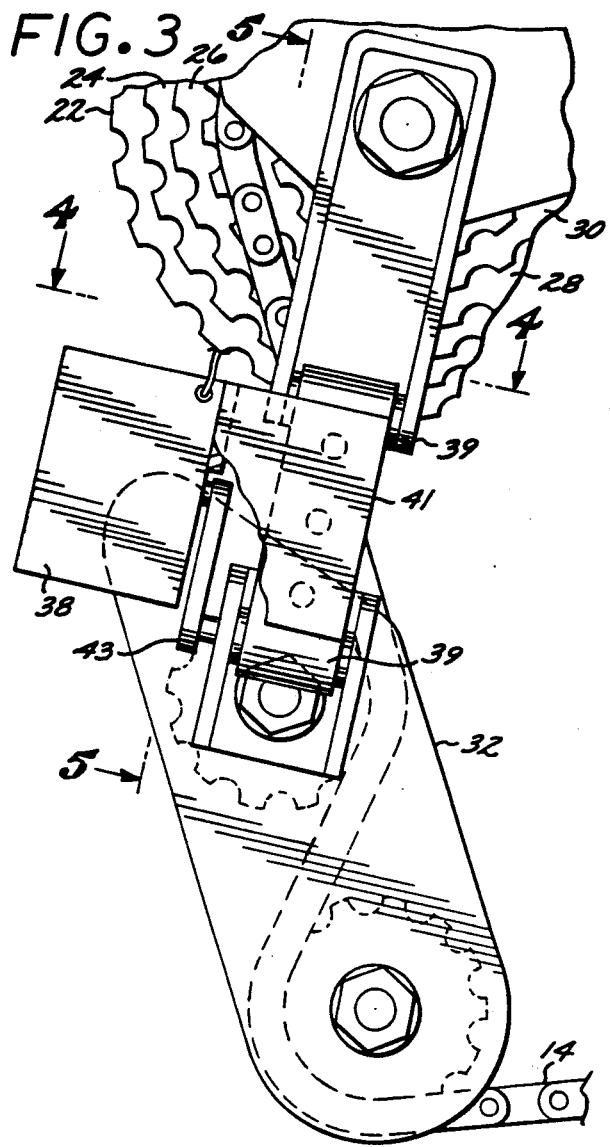
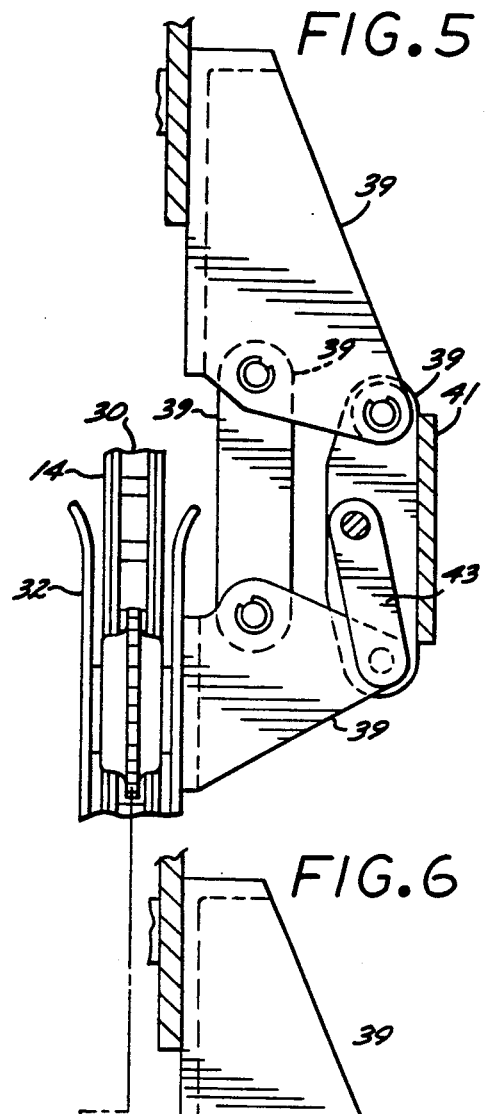
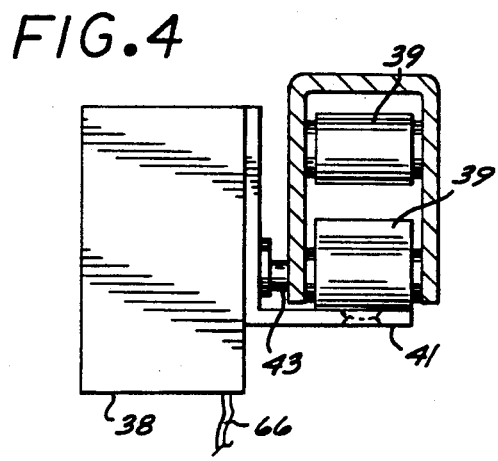
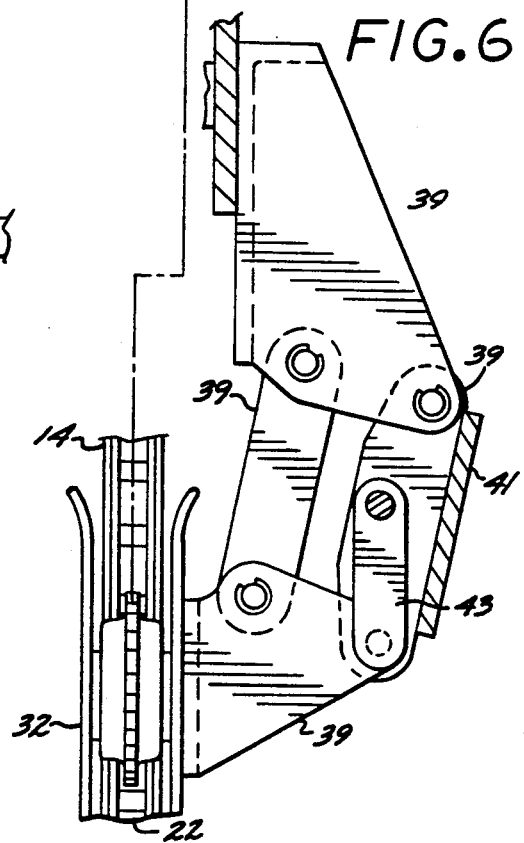

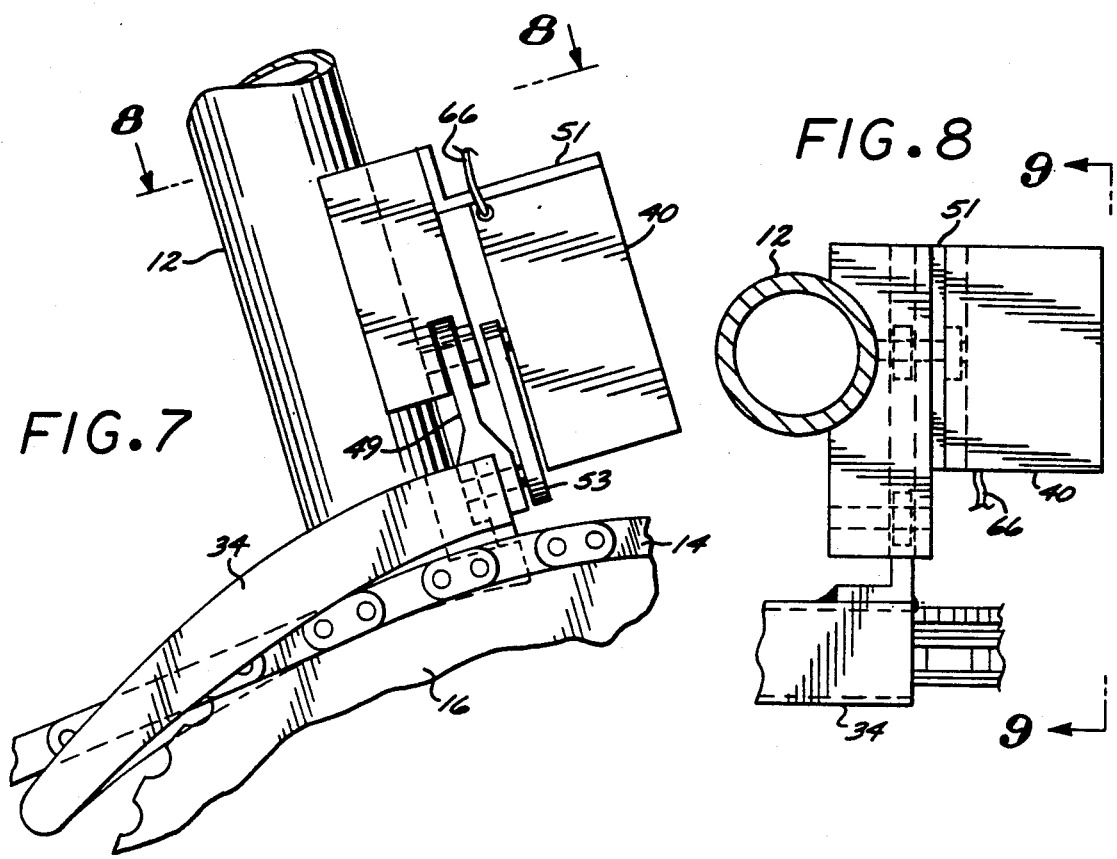
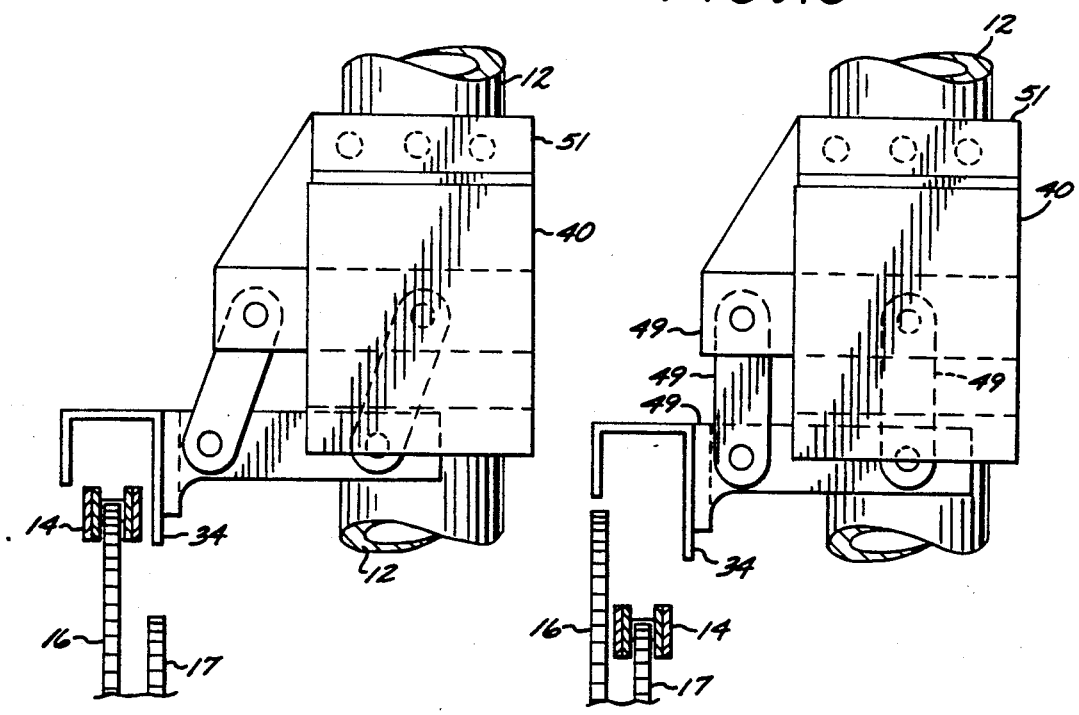

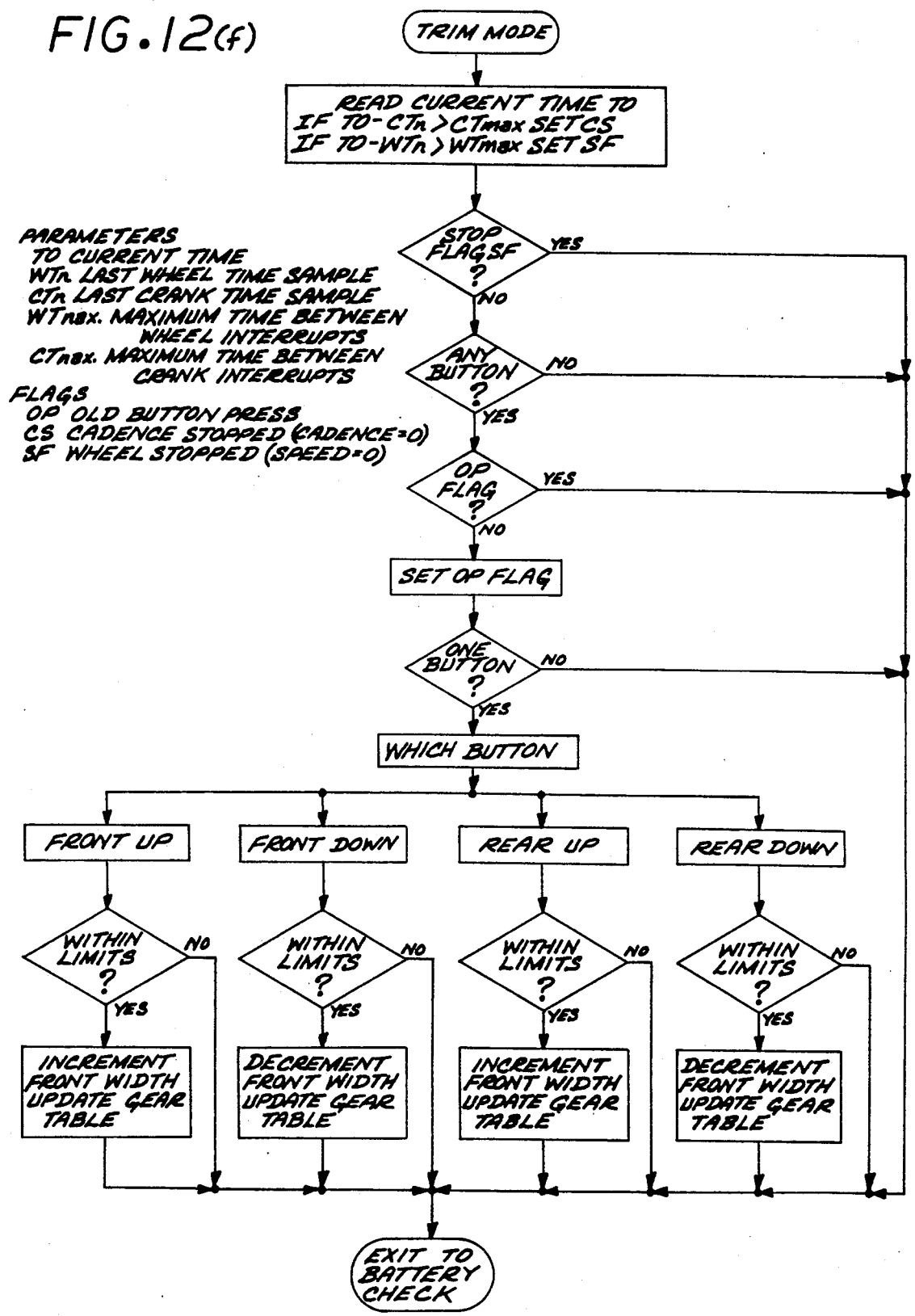

GEAR SHIFTING SYSTEM FOR DERAILLEUR EQUIPPED BICYCLE

BACKGROUND OF THE INVENTION

1. Field of the Invention

The present invention relates to an improved automatic gear shifting system having automatic and manual modes of operation for use on derailleur equipped bicycles and more particularly, to an improved derailleur shifter where, in the automatic mode of operation the gear ratio between the driving and driven gears can automatically varied in response to wheel speed and crank speed sensors, the output signals therefrom and signals from an operator's control panel being processed by a microcontroller, and where, in the manual mode of operation, the bicycle user can change the gear ratio by activating a pushbutton on the control panel.

2. Description of the Prior

Bicycle transmissions wherein the gear ratio can be automatically varied through a contractible and expandable large diameter sprocket wheel construction in response to the effort exerted upon the pedals by the cyclist are known. For example, in U.S. Pat. No. 4,693,700 to Chappell, a number of such prior art devices are disclosed, including those of varying the gear ratio by applying special constructions at o about the cluster gears to function the derailleur for gear change purposes. The Chappell patent further notes that the prior art constructions included electrical changers, pneumatic changers and other mechanical devices which were intended to remotely operate the derailleur and notes that most or all of the prior art gear changing devices required conscious effort on the part of the bicycle rider in order to effect a desired gear change. The Chappell device comprises a fixed frame connected arm, a shifter arm moveable relative to the fixed arm, the moveable shifter arm carrying a chain follower in sliding engagement with the bicycle chain, a spring biasing means between the two arms urging the follower to depress the chain and a cable interconnected between the moveable shifter arm and the derailleur to automatically shift the derailleur in response to chain tension as sensed by the follower. Thus, indexing of the derailleur to move the chain between the cluster gears is automatically accomplished without the conscious effort on part of the rider.

One obvious disadvantage of the system is that the effected gear ratio is dependent on the stress applied to the bicycle chain, a parameter obviously dependent heavily on the physical efforts of the rider.

U.S. Pat. No. 4,599,079 also to Chappell, discloses a similar device to that set forth in U.S. Pat. No. 4,693,700 and provides a different bicycle chain tension sensing mechanism.

U.S. Pat. No. 4,857,035 to Anderson discloses an automatic bicycle power transmission system, the bicycle having only a single sprocket mounted at the rear wheel without a derailleur system.

U.S. Pat. No. 4,938,324 to Van Dyke discloses an automatic derailleur shifter which improves upon the prior mentioned Chappell patents by providing a hydraulic cylinder stabilizing means to control and slow the pivotal movement of the moveable shifter arm.

While the Chappell and Van Dyke patents disclose an automatic derailleur type shifting mechanism, the systems require a complicated and expensive array of mechanical parts. Further, shifting is dependent upon the tension of the bicycle chain, which, in itself, provides an inefficient way for controlling the derailleur. In this regard, neither the velocity of the bicycle or the rotational speed of the pedals is utilized directly to control the bicycle gear ratio, two parameters which more closely relate to the bicycle rider and which, would prove to be an effective way of providing the most efficient gear ratio for a bicycle rider.

SUMMARY OF THE PRESENT INVENTION

The present invention provides a dual mode gear shifting system for moving the chain on a multi-speed bicycle between rear sprockets on the rear freewheel and chainwheels on the front crank on a multi-speed bicycle. The system will accommodate freewheels with six, seven or eight sprockets and front cranks with two or three chainwheels.

The system comprises a microcontroller, a front derailleur and servomotor assembly, a rear derailleur and servomotor assembly, a wheel speed sensor assembly, a crank speed sensor assembly, a mode selector assembly, or control panel, which contains the microcontroller, a power supply and a cable assembly.

The microcontroller receives inputs from the mode selector, wheel speed and crank speed sensors and provides drive position signals to the front and rear derailleur assemblies servo motors. The microcontroller also provides an indication of the power supply, typically a battery, condition.

The front derailleur and servomotor assembly converts position drive signals from the microcontroller to control the front derailleur in a manner such that the bicycle chain is positioned onto the selected chainwheel. The rear derailleur and servomotor assembly converts position drive signals from the microcontroller to position the rear derailleur in a manner such that the bicycle chain is positioned onto the selected rear sprocket. The wheel speed sensor senses the speed of the bicycle and provides an electrical output to the microcontroller in the automatic mode of operation. In this mode, the crank speed sensor senses the speed of the crank and also provides an electrical output to the microcontroller. The mode selector assembly, or control panel, is actuated by the bicycle user to select the automatic gear shifting system mode of operation or the manual mode of operation and provides the selected modes and signals for the microcontroller. The mode selector assembly also has a display portion which provides an indication of the battery condition provided by the microcontroller output. Means are provided for mounting the microcontroller and the battery power supply within the mode selector. The battery power supply provides power to all of the electrical components of the system. The cable assembly connects the speed sensors and the front and rear derailleur servo motors to the mode selector, microcontroller and battery power supply. In the manual mode of operation, the bicycle rider is able to directly select a chainwheel and rear sprocket through pushbuttons on the mode selector. In the automatic mode, the bicycle rider chooses a crank speed range and the gear ratio is automatically selected to maintain crank speed within the selected range.

The present invention thus provides a dual mode gear shifting system which utilizes a microcontroller which has a selected algorithm to adjust the bicycle gear ratios to maintain pedaling rate, or cadence, within a predetermined range. In the automatic mode, the rotational ratio of the wheel and crank are compared to prestored gear ratios to determine if the cyclist is pedaling or coasting before a shift is allowed. This prevents a coasting cadence from causing an unwanted downshift and enables the most efficient gear ratio to be selected. In the manual mode, selecting a particular pushbutton on the mode selector causes the microcontroller to adjust the bicycle chain position on both the front chainwheels and the rear sprockets in a sequential manner to either a larger or smaller gear until the bicycle user has determined that a desirable gear ratio has been reached. Thus, the invention enables a bicycle user, instead of adjusting two gear levers while operating the bicycle to reach a desired gear ratio, the standard technique in current multiple gear bicycles, to simply push a button to accomplish the same result.

It should be noted that although the present invention discloses a dual mode gear shifting system, the teachings of the present invention can utilized in providing a bicycle which utilizes either the automatic or manual modes of operation and thus provide a single gear shifting mode of operation.

The present invention also provides a simplified technique of improving bicycle riding efficiency while minimizing the use of additional mechanical components which would normally increase the weight and complexity of the system.

BRIEF DESCRIPTION OF THE DRAWING

For a better understanding of the invention as well as other objects and further features thereof, reference is made to the following description which is to be read in conjunction with the accompanying drawing wherein;

FIG. 3 is a detail of the rear derailleur system with the servo motor assembly mounted thereto;

FIG. 4 is a view along line 4—4 of FIG. 3;

FIG. 5 is a view along line 5—5 of FIG. 3 with the bicycle chain on the small sprocket;

FIG. 6 is a view along line 6—6 of FIG. 3 with the bicycle chain on the large sprocket;

FIG. 7 is a detail of the front derailleur system with the servomotor assembly mounted thereto;

FIG. 8 is a view along line 8—8 of FIG. 7;

FIG. 9 is a view along line 9—9 of FIG. 8 with the bicycle chain on the larger chainwheel;

FIG. 10 is a view along line 9—9 of FIG. 8 with the bicycle chain on the small chainwheel;

DESCRIPTION OF THE INVENTION

The gear shifting system of the present invention comprises a microcontroller (although the term "microcontroller" is utilized and a definition is set forth hereinafter, other terms which can be utilized to characterize the function of the programmed control device are "microprocessor" and "microcomputer"), a plurality of sensors which allow the microcontroller to determine the status of the bicycle, at least two actuators to drive the bicycle derailleurs (shift mechanisms), and a mode selector assembly, hereinafter referred to as a control panel, to allow the bicycle rider to select operating modes, including manual activation of the shifters, and a display for speed, cadence, battery condition and other functions.

Figure 1:
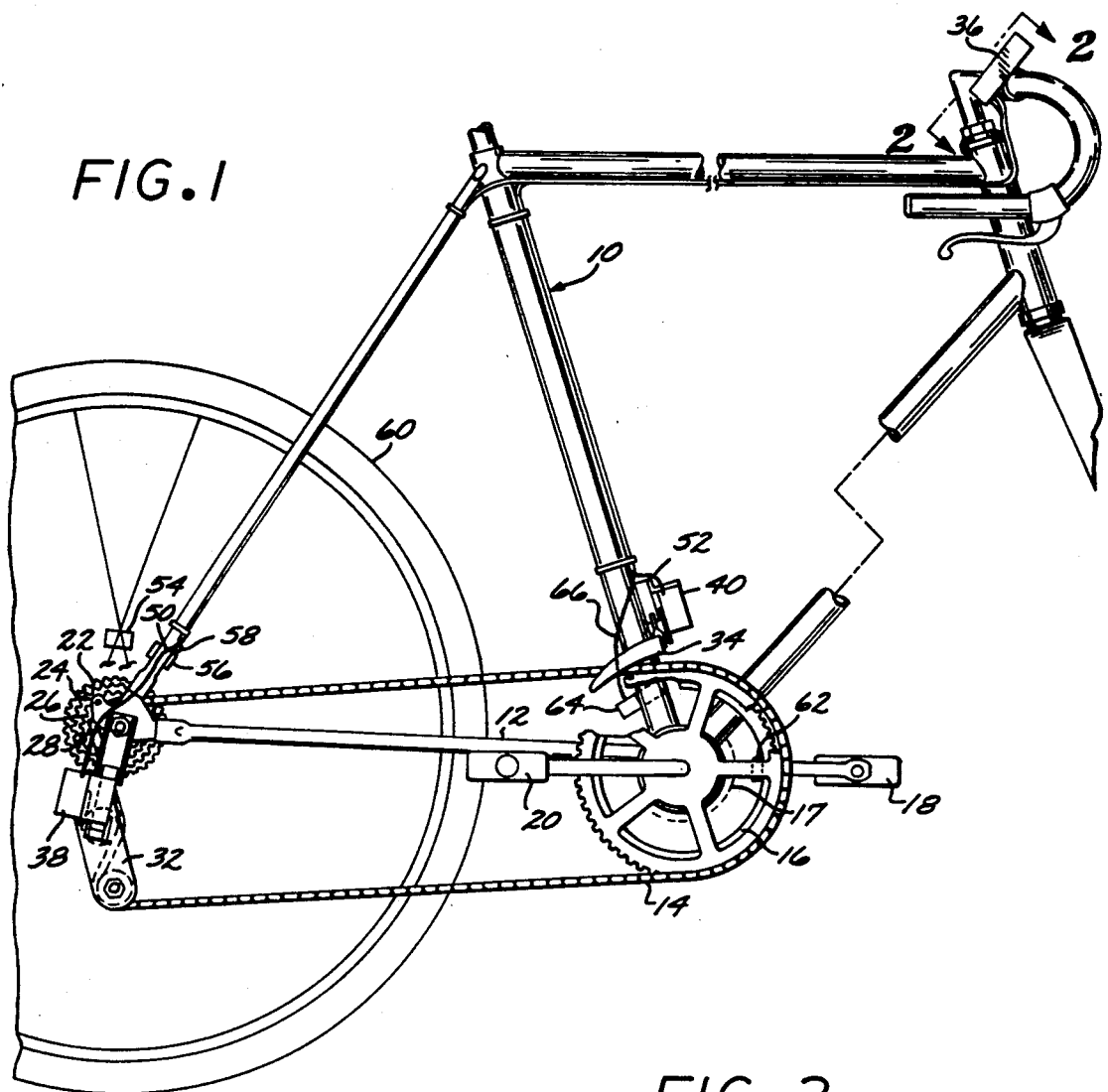
FIG. 1 is a partial side elevational view of an automatic derailleur shifter for a bicycle transmission in accordance with the teachings of the present invention.

Referring now to FIG. 1, a portion of bicycle 10 is illustrated and comprises a frame 12, and a bicycle chain 14 which is rotationally driven by one or more large drive gears, or chainwheels. For illustrative purposes, chainwheel 16 and a smaller chainwheel 17 are coupled to right and left pedals 18, 20 for chain rotative purposes in the usual manner. In the illustrated embodiment, chainwheels 16 and 17 are utilized in a conventional manner to provide for the common ten speed bicycle transmissions although the invention can be utilized with other gear and bicycle transmission arrangements.

In a conventional manner, a plurality of cluster gears (sprockets) 22, 24, 26 and 28 are rotationally carried on the rear bicycle axle (not shown) in the usual manner for selective engagement by the bicycle chain 14 as controlled by the indexing function of a conventional derailleur 32, which derailleur is secured to the rear of the bicycle frame.

In accordance with the teachings of the present invention, a second indexing derailleur 34 is mounted adjacent the chainwheels 16 and 17 as illustrated. In addition, a handle bar mounted control panel 36, to be described in more detail with reference to FIG. 2, contains the microcontroller portion of the invention and operator initiated switches and display functions. Servomotors 38 and 40 are coupled to the rear and front derailleurs 32 and 34, respectively, to control the indexing of their corresponding derailleurs in accordance with signals supplied by the microcontroller along cable 50 and 52, respectively. A spoke mounted magnet 54 is operatively coupled to frame mounted sensor 56, the sensor providing an electrical signal to the microcontroller along cable 58 for each revolution of the rear wheel 60. This signal thus provides an indication of bicycle velocity to the microcontroller, the microcontroller in turn utilizing this signal to generate derailleur indexing signals to provide the most efficient gear ratio as will be explained in more detail hereafter. In a similar manner, a crank wheel mounted magnetic pickup 62 is operatively associated with magnetic sensor 64 to generate an electrical signal for each revolution of the pedals (or chainwheel 17), this signal being coupled to the microcontroller via cable 66.

The microcontroller (described in more detail hereafter) has at least two input capture functions and two output functions and enough additional input and output ports to read the button and switch control panel 36 and to drive the display thereon.

The front and rear derailleurs 32 and 34 preferably are driven by pulse-width modulated servomotors. If other chain shifting mechanisms are used to control derailleur shifting some modifications would be necessary to the software routines driving the shifting mechanisms. Other mechanisms that might be used are, for example, DC motors, stepper motors, solenoids, or other electro-mechanical devices. The wheel and crank sensors are arranged to stimulate separate processor interrupts each time a full wheel or crank rotation occurs although sensors that cause more than a single interrupt per revolution can also be used with minor modifications to the software. In addition to the wheel and crank sensors, other sensors might be used to enhance automatic mode operation, such as a tension sensor to determine the tension on the drive chain, a sonic sensor to determine if the chain is making excess noise and requires trimming, a slope sensor to determine if the bicycle is climbing or descending, and wind sensor to determine if head or tail winds are being encountered. These additional sensors are not essential to the present invention; the cadence and speed sensors are for the automatic mode of operation.

All necessary constants and other fixed parameters are stored in permanent or semi-permanent memory of the microcontroller at the time of installation of the system of the present invention on the bicycle. These include specific numbers and sizes and physical location of sprockets and chainwheels, a specific shift sequence for automatic shifting, a threshold speed below which a low-speed flag will be set, an acceleration threshold above which an acceleration flag will be set, and maximum time values which, if exceeded between sensor pulses, will signify that the wheel and/or crank are stopped.

Figure 2:
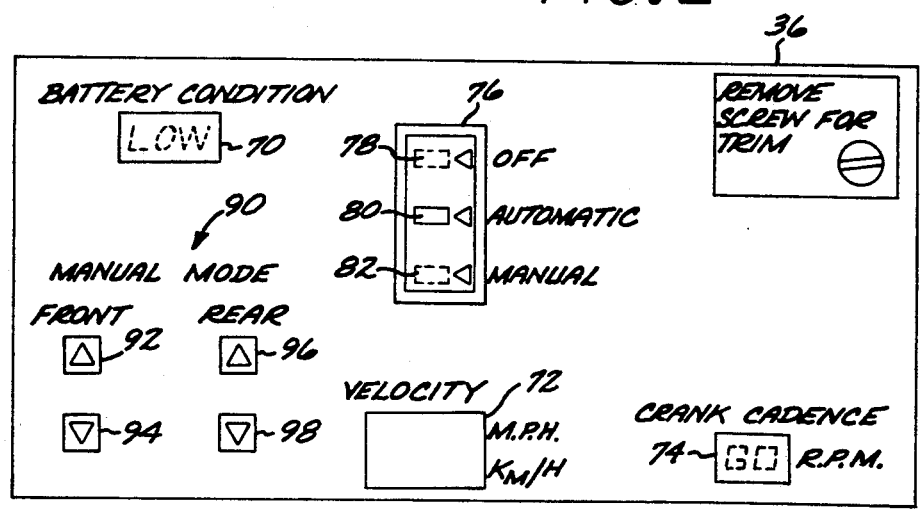
FIG. 2 is a view along line 2—2 of FIG. 1 showing the handle bar mounted mode selector device.

FIG. 2 illustrates the front panel of control unit 36. Display 70 provides an indication as to condition of the battery mounted in unit 36; display 72 indicates the velocity of rear wheel 60; display 74 indicates the speed of drive chainwheel 16 or 17; switch panel 76 (comprising three pushbuttons 78, 80 and 82), puts the system in the inactive, or off state, the automatic mode or the manual mode, respectively; a manual mode area 90 comprising up/down front chainwheel pushbuttons 92 and 94, respectively, and up/down rear sprocket pushbuttons 96 and 98, respectively and a panel area 100 for adjusting the bicycle trim, the trim adjustments being set upon installation to take into account the position of the derailleurs over the sprockets and chainwheels.

FIG. 3 is a detailed drawing of the rear derailleur system 32 with the servomotor assembly 38 mounted thereto. The servomotor assembly 38 is mounted to the four bar linkage mechanism 39 (a conventional feature in most derailleur systems) utilizing machined bracket 41. The rotational motion of the servomotor 38 is transferred to the four bar linkage mechanism 39 through the servomotor drive link 43 which results in the movement of the rear derailleur system 32. Precise indexing of the derailleur system 32 is driven by pulse-width modulated signals from the microcontroller as will be explained hereinafter in more detail.

FIG. 4 is a view along line 4—4 of FIG. 3 showing the detail of the servomotor 38 and the servomotor mounting bracket 41 installed on to the outboard link of the four bar linkage mechanism 39.

FIG. 5 is a view along line 5—5 of FIG. 3 showing the detail of the rear derailleur system 32 in a position with the bicycle drive chain 14 engaged with the outboard sprocket 30.

FIG. 6 is a view along line 6—6 of FIG. 3 showing the detail of the rear derailleur system 32 in a position with the bicycle chain 14 engaged with the inboard sprocket 22.

FIG. 7 is a detailed drawing of the front derailleur system 34 with the servomotor assembly 40 mounted thereto; the servomotor assembly 40 is mounted to the conventional four bar linkage mechanism 49 utilizing a machined bracket 51. The rotational motion of the servomotor 40 is transferred to the four bar linkage mechanism 49 through the servo drive link 53 which results in the movement of the front derailleur system 34. Precise position (indexing) of the front derailleur system 34 is driven by pulsewidth modulated signals from the microcontroller mounted in control panel 36.

FIG. 8 is a view along line 8—8 of FIG. 7 showing the mounting of the front derailleur system 34 and the servomotor assembly 40 mounted to the bicycle frame 12.

FIG. 9 is a view along line 9—9 of FIG. 8 showing the detail of the front derailleur system 34 in a position with the bicycle drive chain 14 engaged with the front large chainwheel 16 and FIG. 10 is a view along line 9—9 of FIG. 8 showing the detail of the front derailleur system 34 in a position with the bicycle drive chain 14 engaged with the front small chainwheel 17.

Figure 11:
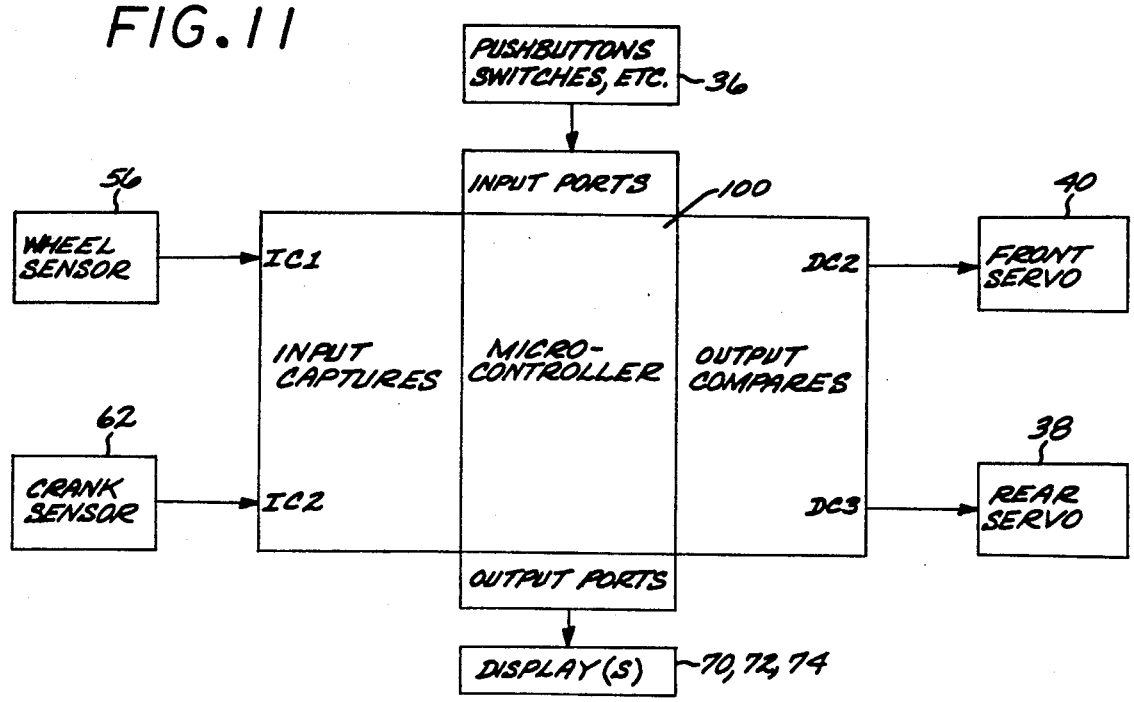
FIG. 11 is a block diagram of the control system of the present invention.

FIG. 11 is a block diagram of the controller portion of the present invention. In particular, the electrical output signals from wheel sensor 56 and crank sensor 64 are coupled to the IC1 and IC2 inputs, respectively, of microcontroller 100. A microcontroller which can be utilized is Model 68HC11 manufactured by Motorola Corporation, Phoenix, Ariz. The control signal generated by the pushbuttons and switches on control panel 36 are coupled to the input ports of microcontroller 100. The microcontroller output port is connected to display 102, representing the BATTERY CONDITION, VELOCITY and CRANK CADENCE displays on unit 36. The control outputs from microcontroller 100 at ports OC2 and OC3 are connected to the front servomotor 40 and rear servomotor 38, respectively.

The flow charts illustrated in FIGS. 12(a)–12(g) are set forth to enable a computer programmer to program microcontroller 100 to control the front and rear servomotors in a manner to provide the most efficient gear ratio for a particular bicycle rider and to provide the appropriate data to the displays on unit 36.

The selected algorithm adjusts the bicycle gear ratios to maintain pedaling rate or cadence within a pre-determined range in the automatic mode of operation. The rotational ratio of the wheel and crank are compared to pre-stored ratios to determine if the cyclist is pedaling before a shift is allowed; this prevents a coasting cadence from causing an unwanted downshift. As the bicycle slows to a stop, shifting is limited to a single down-shift since it is not desirable to shift to the lowest available gear each time the bicycle stops. Finally, when the bicycle is accelerating at low speeds, downshifts are inhibited, even at low cadences, to prevent unwanted shifts when accelerating after a stop. In the manual mode, depression of one of the four pushbuttons is converted to an electrical signal input to the microcontroller, the output thereof moving the front and/or rear derailleurs until the bicycle chain is positioned to the desired sprocket/chainwheel. The gear shifting system operating mode, as noted hereinabove, is selected by pushbuttons 78, 80 and 82. Although the electrical connections for implementing the selection process are not illustrated since they are conventional, by pressing button 78 the battery (not shown) is disconnected from the servomotors, microcontroller, displays, etc. When button 80 is pushed, the battery is connected to energize the components requiring energy, including the microcontroller, displays, servomotors, etc. When button 82 is pressed, the microcontroller is instructed to ignore the signals from sensors 56 and 64 as to servomotor positioning requirements and to only generate servomotor positioning signals in response to the activation of either pushbutton 92, 94, 96 or 98 and at increments programmed into the microcontroller.

A microcontroller is a microprocessor with built-in input/output capability suited to control applications. A/D converters, timers, digital and analog outputs and inputs, pulse width modulators and other devices may be incorporated into particular controllers. The description that follows is based on the Motorola 68HC11 controller family. These controllers include timers, output-compare functions, input capture functions and a variety of other I/O features. Other processors such as the Intel 8048/8049/8051 series also include similar functions and thus can be utilized in the present invention.

Software for controllers is normally partitioned into background, or interrupt driven routines, and foreground, or non-interrupt, driven routines. Foreground routines are those routines that the processor "normally" executes. Background routines are initiated by some external event, such as a signal from an external sensor. When an external signal occurs, it causes the processor to temporarily suspend its normal operations in order to serve the external event. The foreground routine has been "interrupted", and resumes only after the background or interrupt service routine has been completed.

The foreground routine normally makes calculations, implements complex algorithms, monitors manual inputs, updates displays and manages other resources to communicate with the system operator (bicycle user). In order for the foreground routine to use information generated by the autonomous background routines, it is necessary to establish communications between the two classes of routines. This is accomplished by use of memory locations commonly referred to as "mailbox locations". An interrupt routine will typically compute a new value of a specific parameter (speed, cadence, etc.) and store it in a pre-assigned memory location, then will set a flag (toggle a bit in a particular memory location) to signify that a new value has been generated. The foreground routine must periodically check flag locations to determine when new data are available. When a flag is set, a foreground service routine is activated and the new data are processed. After processing is complete, the foreground routine resets the flag and proceeds with its normal processing until the interrupt routine sets the flag again.

The preferred routines for the system of the present invention comprise one foreground and three background routines. The foreground routine implements three independent operating modes, manual, trim, and automatic.

BACKGROUND ROUTINES

1. Real-time Interrupt (RTI)

The servomotors utilized in the present invention are controlled by variable width pulses at a rate of approximately 60 Hz. Variations in pulse width between approximately 1.0 to 1.5 milliseconds (msec) position the rotary servo output over its rated range of about 45 degrees. A real-time interrupt (RTI) routine interrupts the controller at a fixed rate which is established during processor initialization. For this application, the RTI is initialized to interrupt the processor at a 60 Hz rate. Each time one of these interrupts occurs, a pulse is sent to each of the two servomotors, thereby establishing the required 60 Hz pulse trains.

Figure 12A:
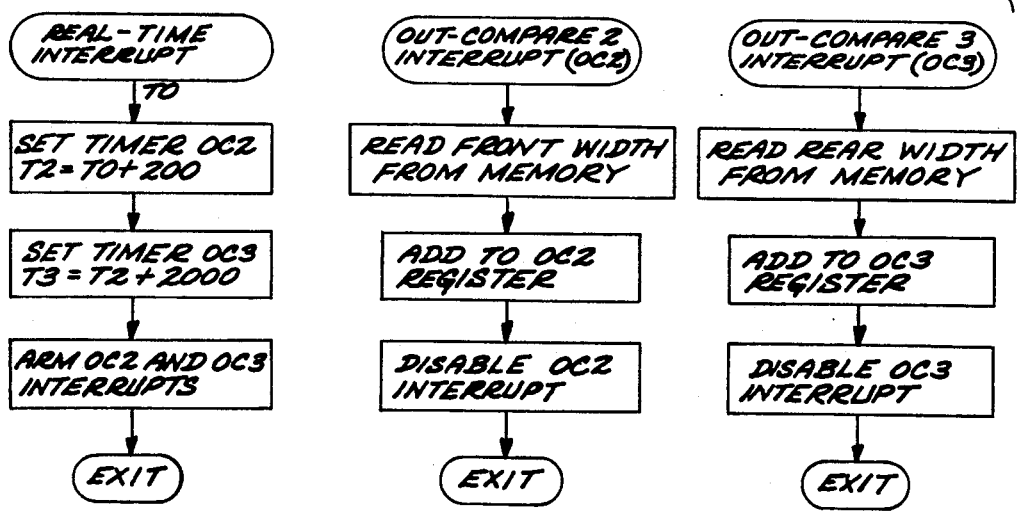
FIG. 12(a)-12(g) are flow charts for the microcontroller shown in FIG. 11.

FIG. 12(a) is a flow chart of the required RTI function. Referring to the figure, this routine is invoked at a 60 cycle rate which is controlled by a crystal or other oscillator source connected to the microcontroller clock input pins. When an interrupt occurs, the interrupt service routine retrieves a value from memory representing the current pulse width to control the front derailleur servo 40 and a pulse of this width is output on a specific processor pin. A second value representing the pulse width for the rear servo 38 is then retrieved and a second pulse is generated on a second output pin. These pulses cause the servomotors 38 and 40 to rotate to a pre-determined position which in turn mechanically selects a gear ratio by positioning the bicycle drive chain 14. The pulse width values are set by the foreground routine, described hereinafter.

FIG. 12(a) illustrates a specific implementation for controllers which incorporate output compare functions. An output compare function causes a pre-determined output pin to toggle between two voltages each time the value in a pre-set register matches the value in a timer register. The timer register is controlled by a constant frequency oscillator which is usually the primary clock oscillator for the microcontroller, modified by a suitable scale factor. FIG. 12(a) is both a second level flow chart and a processor-specific flow chart.

The RTI function incorporates three separate interrupts and their service routines. The routine on the left is invoked every 16.7 msec (60 Hz) by the processor RTI hardware timer. The interrupt service routine reads the time stored in the RTI timer register to determine when the RTI occurred. A fixed value is added to this time and the sum is sorted in one of the output compare registers. For example, an assumed delay of 200 microseconds (usec) is added to the time value and stored in output compare OC2. A second delay, assumed to be 2000 usec or 2 msec, is then added to the OC2 value and this new time is stored in another output compare register OC3. OC2 an OC3 interrupts are then enabled to cause interrupt to occur when the output compares occur, and the routine is exited, returning control to the foreground routine.

The 200 usec delay assures that the OC2 interrupt will not occur until the RTI routine has been exited, and the 2000 usec delay for OC3 similarly assures that this interrupt will occur after the OC2 pulse is complete. After 200 usec, OC2 "fires" causing the OC2 output pin to toggle to the high state and simultaneously interrupting the processor, invoking the middle routine in FIG. 12(a). This routine reads a value from memory corresponding to the desired pulse width (determined by the foreground routine), then adds it to the OC2 register and disables the OC2 interrupt. This action will cause OC2 to "fire" at the end of the pulse-width interval which in turn causes the output pin to toggle back to the low state. The OC2 interrupt is disabled to prevent this second OC2 action from invoking the interrupt service routine again. The third column in FIG. 12(a) is a virtually identical flow chart for the OC3 service routine.

2. Wheel Interrupt

Figure 12B:
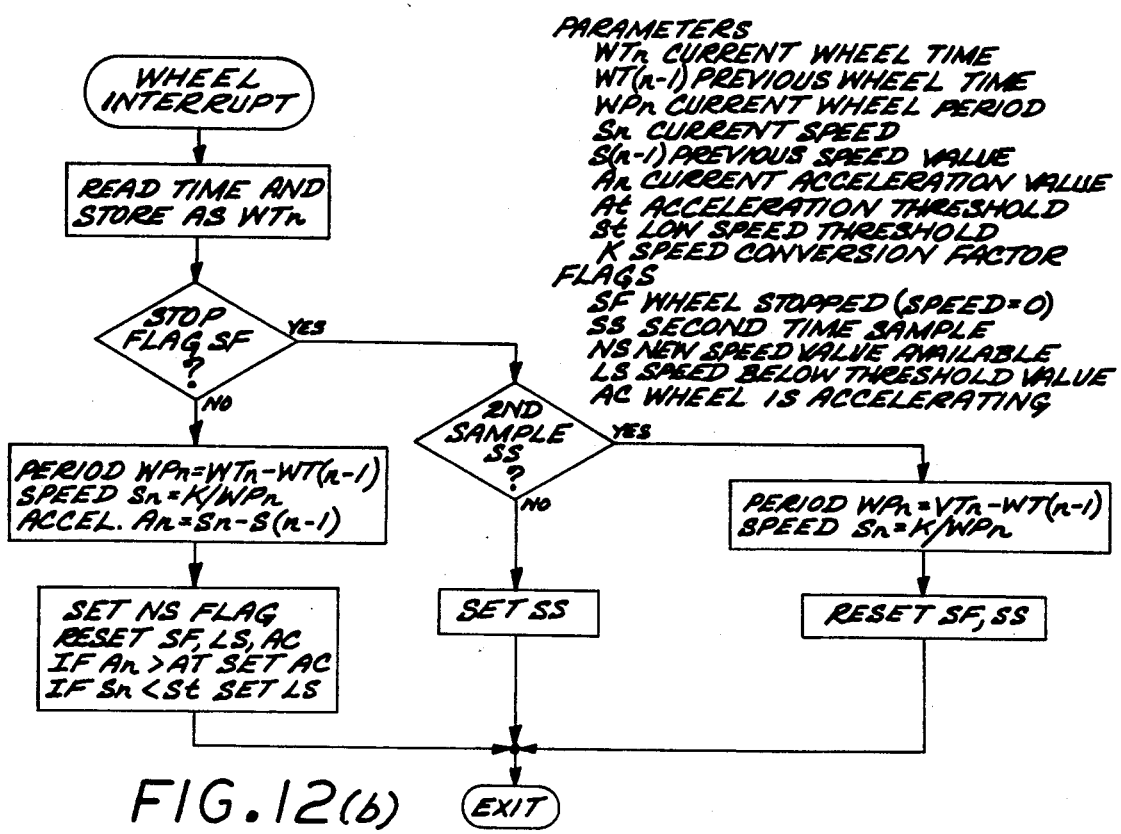

FIG. 12(b) is a flow chart for the wheel sensor. Each time the wheel rotates magnetic sensor 56 causes a signal to interrupt the microcontroller 100. The time of the interrupt is automatically captured in a dedicated hardware register. This time and the time of the previous interrupt is used to calculate the period of wheel rotation. The diameter of the wheel is then used to determine the bicycle speed in MPH, KPH or other suitable units, and a flag is set to signify that a new speed sample is available. The speed is then compared to a stored threshold speed to determine if the bicycle is in a low-speed mode. The two most recent speed values are then used to determine if the bicycle is accelerating. Flags are set or reset to properly reflect these conditions, and the service routine is exited (the automatic gear-shift algorithm uses the low-speed and acceleration flags).

Since interrupts occur only when the wheel is turning, it is impossible for the interrupt routine to determine when the bicycle has stopped. A stopped bicycle is detected by the foreground routine described hereafter. If the foreground routine determines that the bicycle has stopped, the Stop Flag SF is set. This flag is used by the wheel interrupt routine when the bicycle starts rolling again.

When an interrupt occurs, the input capture register is read to determine the time the interrupt occurred, and the time is stored in a memory buffer. The buffer must hold at least two sequential time samples, thus the previous time sample is moved to a different location before the new sample is stored. Assuming the stop flag is not set, the period, speed and acceleration are determined using the formulas in the figure. The K in the speed formula (FIG. 12(b)) is a constant which includes the wheel diameter and the number of seconds in an hour. The acceleration calculation uses the two most recent speed values, thus at least three ti==samples must be read after the bicycle has stopped before a valid acceleration calculation can be made. The stop flag is used to guarantee valid time samples.

After the current time sample is stored, the stop flag is tested and if it is set, the program branches and another flag, the second sample Flag (SS) is tested. If this flag is not set, the branch is not taken and the SS flag is set. The routine is then exited. The SF flag is still set for the next interrupt so the first branch is taken again. This time the SS flag is also set so the second branch is taken. Two samples are available, so the period and speed are now calculated, then both the SF and SS flags are reset and the routine is exited. On the third interrupt the SF flag is no longer set, so the first branch is not taken, and all parameters are calculated. This use of flags assures that there are at least 3 current time samples stored in the buffer before any calculations occur.

3. Crank Interrupt

Figure 12C:
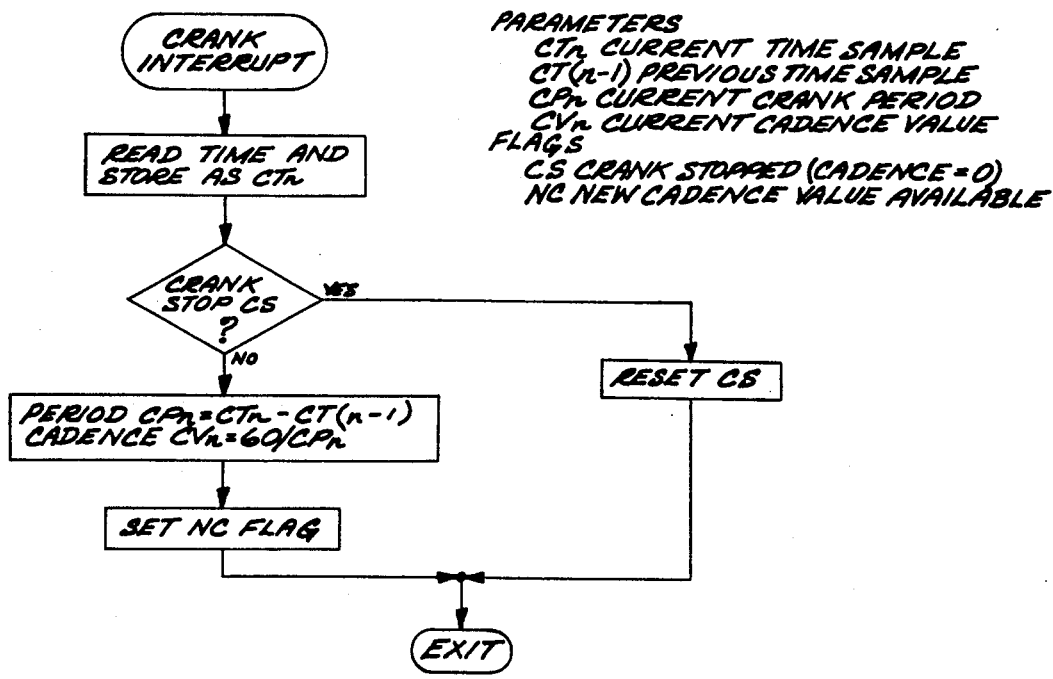

FIG. 12(c) is a flow chart for the crank interrupt service routine. This routine is similar to the wheel interrupt routine, but acceleration is not calculated. Crank period is measured and converted to crank cadence measured in RPM. A Crank Stop Flag (CS) is used in a manner analogous to SF flag in the wheel interrupt routine. Since acceleration is not required, only two valid samples are necessary after the crank stops and the second sample flag is not used.

4. Foreground Routine

The foreground routine controls the system which has three modes, manual, trim, and automatic. In the manual mode, buttons are used to manually select the front chainwheel and the rear sprocket wheel. Each time one of four buttons is pushed, the appropriate servo moves to a new position, thereby selecting a new gear. In the trim mode, the same four buttons are used to adjust the position of the derailleur. When first installed or when something has changed due to wear or other causes, it is necessary to adjust the derailleur position for each sprocket or freewheel. This is required to assure that the selected position reliably causes the correct gear to be selected and also to assure that the derailleur is centered so that the chain runs quietly. By alternately using the manual and trim modes, the derailleur can be calibrated. As each new position is determined, the position (pulse width) is stored in memory for future use. Once this has been done, it is not necessary to repeat the process unless something on the bicycle changes. It should be noted that the trim mode switch is located within control panel 36 and is accessible by removing the top cover.

Although the present invention enables the bicycle rider to select either a manual or automatic mode of operation, the automatic mode is a key feature of the present invention. When automatic mode is selected, bicycle speed and crank cadence are continuously monitored and gears are selected to maintain crank cadence in a pre-selected range.

Figure 12D:
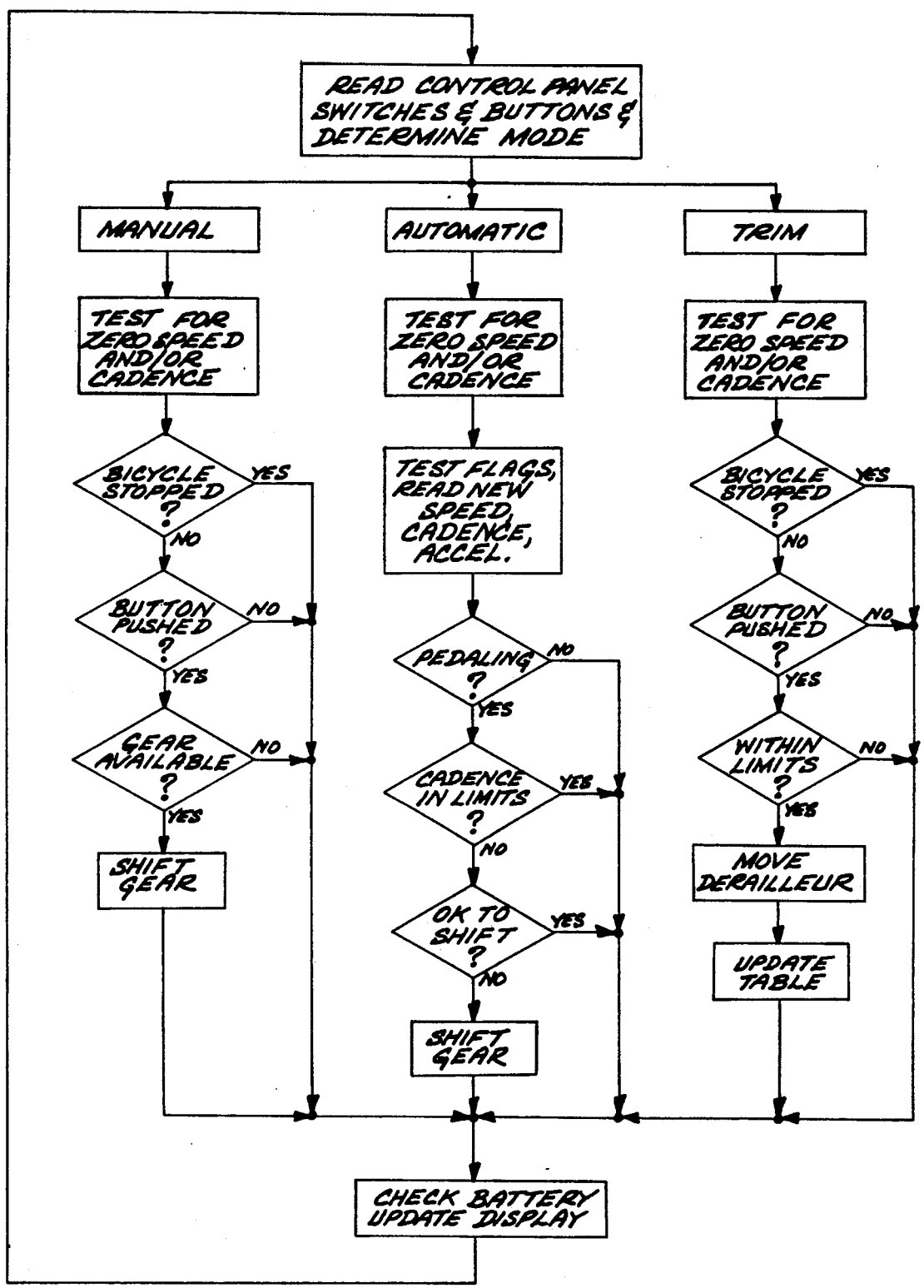

FIG. 12(d) is a top-level flow chart for the foreground routine. As described earlier, the foreground routine is what the processor does when no external events require servicing. The foreground routine is a loop which is repetitively processed as long as the microcontroller 100 is turned on. The illustrated loop starts by reading control panel 36. The control panel, as noted, comprises four buttons and a three-position mode switch. The mode switch will be in manual, trim or automatic. The software reads and stores the button status, then reads the mode switch and branches to the appropriate column. When appropriate mode processing is completed, the routine is exited to the Check Battery and Update Display block at the bottom of the diagram. Here the battery condition (voltage) is tested. The condition of the battery, bicycle speed, crank and cadence and/or other functions are then written to the display device. After the display is updated the loop is completed and the buttons are polled again.

Since display processing is widely known, the flow chart therefore has not been set forth.

A. Manual Mode

Manual mode processing is outlined in the left column of FIG. 12(d). The software tests to see if the cadence or wheel speed has dropped to zero and sets appropriate flags if so. The stop flag is tested and the routine is exited if the bicycle is not moving. Button status is then checked, and if no buttons have been pushed, the routine is exited. If a button has been pushed, the software checks to be sure that the derailleur is not already in its last position. If it is not, the next gear is selected. Gear selection is accomplished by retrieving a pulse width from a table within microcontroller 100. The elements of the gear table are defined at installation and when the system is trimmed (Section B hereinafter). The pulse width represents the physical position the servo must move to in order to select the appropriate gear. This pulse width is stored in the pre-selected memory location described in the RTI routine. When the RTI routine is next invoked the new pulse width will be used to generate the signal sent to the appropriate servo, thereby mechanically repositioning the derailleur and changing the selected gear.

Figure 12E:
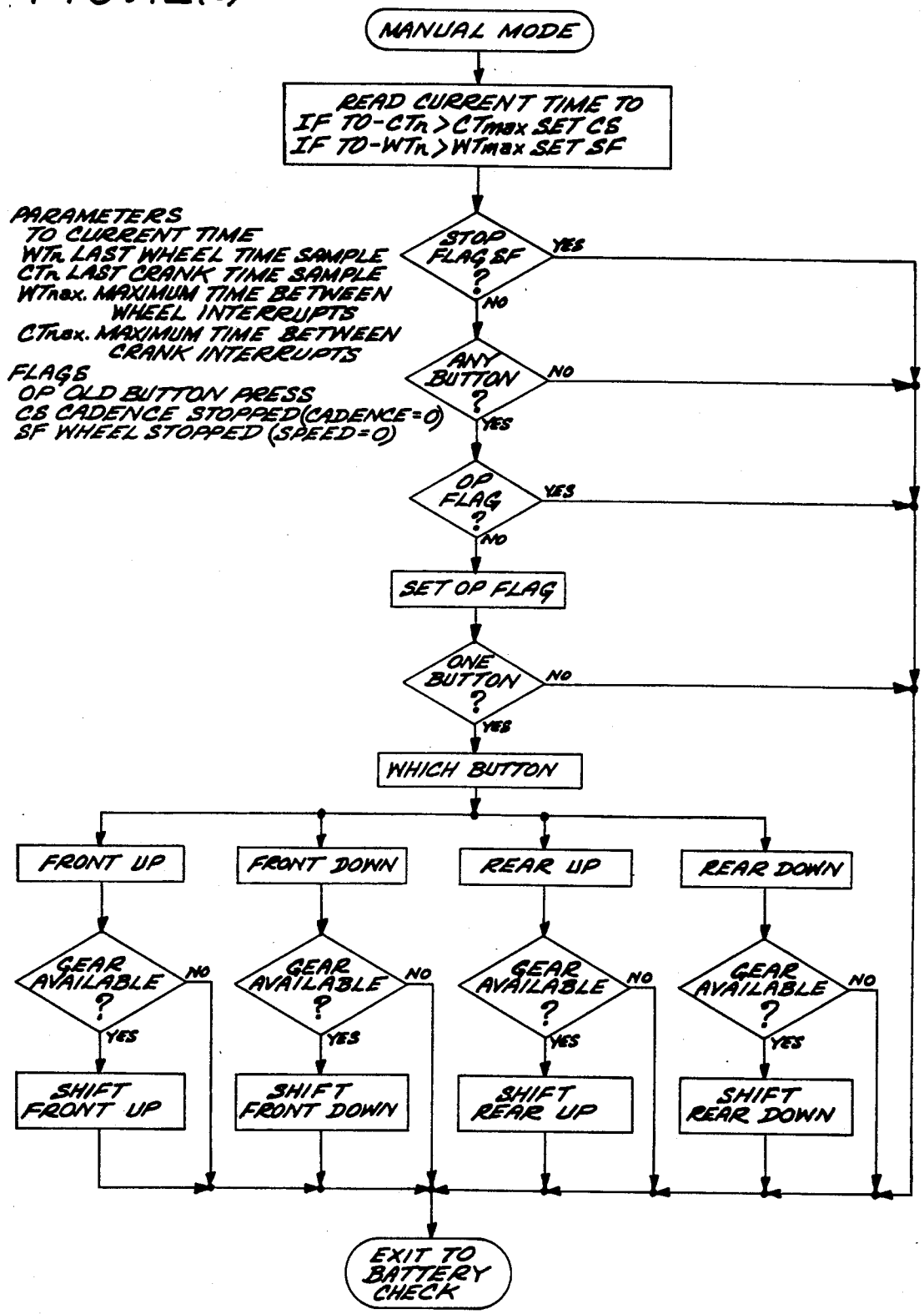
Figure 12:
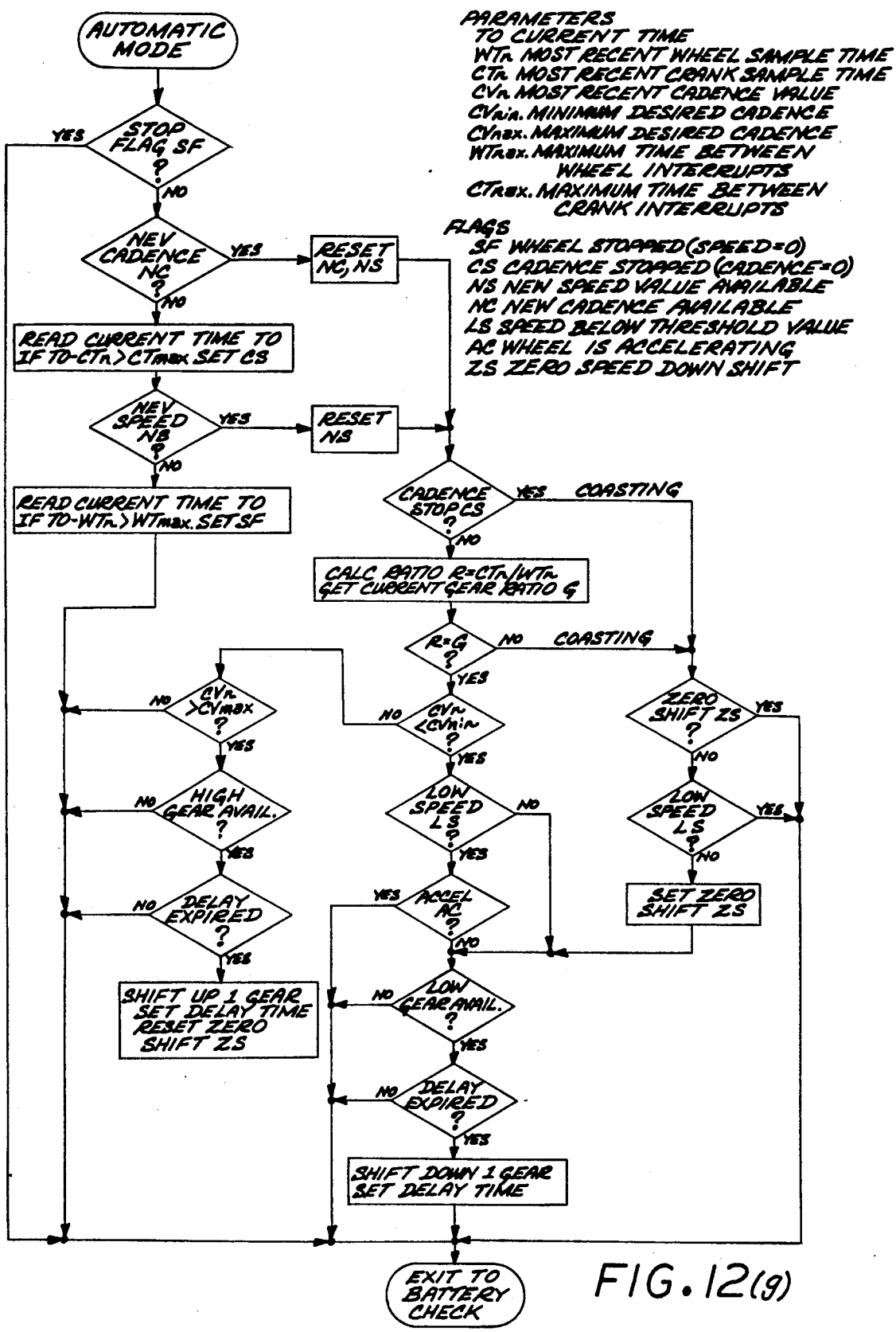

A more detailed diagram of the manual mode routine is depicted in FIG. 12(e). This diagram represents the left column of FIG. 12(d). When the manual mode is entered, the current time is read from the system clock and compared to the most recent wheel and crank interrupt times. If the time since the last interrupt exceeds a pre-determined value, the wheel and/or crank is assumed to have stopped and the appropriate flag (SF or CS) is set. This test must be conducted in the foreground routine since the wheel and/or crank background routine will not be invoked if the wheel or crank is not turning.

The Stop Flag (SF) is now tested and if it is set, the routine is exited, preventing shifts while the bicycle is not moving. If the crank is turning, the button status is tested to see if any buttons are pushed. If they are, the Old Press (OP) flag is tested to see if this button has already been serviced. If the flag is set, the routine is exited, thereby preventing multiple shifts for a single button push. If the flag is not set, it is set to prevent shifting the next time through the loop. This flag effectively requires the buttons to be released before a second shift can occur.

The next test determines if one and only one button is pushed. If more than one is pushed, the routine is exited. If one is pushed, the software branches to the appropriate routine. This description assumes four buttons, an up and a down button for both the front and rear derailleurs. The current location of the derailleurs is now tested to determine whether the last available position for the selected function (front up, front down, rear up, rear down) is already in use. If it is, the routine is exited. If it is not, the shift is accomplished by selecting the appropriate pulse width.

B. Trim Mode

The trim mode flow charts are the right-hand column in FIG. 12(d) (to level) and FIG. 12(f) (second level). The routine are nearly identical to those for the manual mode and only the differences will be described. When one of the buttons is pressed, instead of changing the pulse width by a large amount to cause a gear change, the pulse width value is incremented or decremented by a small amount to reposition the derailleur slightly. Pre-set limits are incorporated into the microcontroller 100 to prevent moving the derailleur too far, and these limits are checked before the derailleur is moved (FIG. 12(f)). Finally, after the derailleur is repositioned the appropriate pulse-width which is stored in a table is updated so that the manual and automatic modes will use the new values for subsequent shifting.

C. Automatic Mode

The center column of FIG. 12(d) shows the top-level flow for the automatic mode. The zero speed and cadence tests are conducted and the new speed an new cadence flags are then tested. If new values are available, a calculation is conducted to determine if the bicyclist is pedaling or coasting. If pedaling, cadence is checked to see if ti is within the prescribed limits. If it is not, then a number of other tests are conducted to see if it is proper to shift. If it is, the shift is invoked and the routine is exited.

FIG. 12(g) is a second-level flow chart for the automatic mode. Upon entry the stop flag SF is tested (1) and the routine is exited if it is set. If not set, the new cadence flag NC is tested (2). If NC is not set, the current time TO is read and used to determine if the crank is stopped; if it is the CS flag is set (3). The new speed flag NS is tested next (4) and if it is not set, the current time is compared to the last wheel interrupt time and the stop flag SF is set if a pre-determined value is exceeded (5), then the routine is exited (24). This sequence down the left column of FIG. 12(g) continues until either a new cadence or new speed value is flagged by one of the background routines or until the stop flag is set.

If a new cadence NC flag or new speed NS flag is detected (2,4) then the flags are reset (6,7) so that the branches will not be taken on the next cycle through the loop. If the NS branch is taken (4) then the cadence stop flag CS could still be set; this is now tested (8). If CS is not set then the ratio R of the most recent crank period and wheel period is calculated. Since the two times represent the time for one revolution of the crank and wheel respectively, R represents the effective rotation ratio. Since the processor keeps track of which gear is currently in use and also has stored the actual gear ratio for all gears, the currently selected gear ratio G is compared to R (10). If they are equal (or nearly equal; a slight error tolerance must be included), then the rider is pedaling and the cadence is considered valid. The current cadence value is compared against the minimum desired cadence (11). If it si below this value the low speed flag LS is checked next (12). If LS is not set then a down-shift is desired and block (14) is entered, since the bicycle is moving at a moderate speed and cadence is too low. If LS is set the acceleration flag AC is tested (13). If this flag is set then a shift is not desired since the bicycle is accelerating at low speed and is probably exiting a stopped condition, so the routine is exited (24). If the flag is not set then a shift is desired and block (14) is entered. In block (14) the currently selected gear s checked against available gears to see if a lower gear is available. If it is, a delay value is then tested (15) to see if a shift is allowed. If there is no pending delay new pulse widths are selected to implement the next lower gear and a delay value is stored to prevent another shift from occurring for a prescribed period of time (16).

If the cadence stop CS is set (8) or the ratio R is below the selected gear ratio G (10) then the bicycle is coasting and the right hand column is entered. The zero shift flag ZS is tested to see if a zero-shift has occurred. A zero-shift is used to shift the bicycle down one gear when the bicycle comes to a stop. This allows the rider to accelerate more easily when he beings riding again. IF ZS is not set, then the low speed LS flag is tested (22). If LS is not set then the bicycle is coasting at a low speed, meeting the conditions for a zero-shift. ZS is set (23) to prevent a second zero-shift and a lower gear is selected as described above (14, 15, 16).

If the cadence is not below the minimum desired value (11) then it is tested to see if it is above the maximum value (17). If it is not then it is within the desired range and the routine is exited (24). If it si too high, the currently selected gear is checked against a table of available gears to see if a higher gear is available (18). If it is then a delay value is tested (19) and if no delay is pending new pulse widths are selected for the next higher gear, a delay time is stored, and the ZS flag is reset (20).

the present invention thus provides a gear shifting system for use on a bicycle wherein a preprogrammed microcontroller is utilized to control the bicycle derailleurs in a manner whereby the most efficient gear ratio for a user is automatically provided. The system is more accurate, more reliable and less expensive than currently available automatic shifting systems.

While the invention has been described with reference to its preferred embodiments, it will be understood by those skilled in the art that various changes may be made and equivalents may be substituted for elements thereof without departing from the true spirit and scope of the invention.

What is claimed is:

1. A method for controlling the gear ratio of a bicycle having a plurality of front chainwheels and a plurality of rear sprockets, front and rear derailleurs controlling the position of a bicycle chain on selected ones of said chainwheels and sprockets comprising the steps of:
generating a first electrical signal corresponding to the velocity of the bicycle;
generating a second electrical signal corresponding to the crank speed of said bicycle;
providing a microcontroller responsive to said first and second electrical signals for calculating the actual gear ratio and comparing it with preset values to see if it is within a first set of limits, if within said first set of limits the microcontroller thereafter determining whether the crank speed is within a second set of limits, the microcontroller generating a third signal if the crank speed is below limits and the bicycle is moving at a speed above a threshold value; and
controlling said front and rear derailleurs in response to said third electrical signal whereby said bicycle chain is downshifted to the next lowest gear.

2. The method of claim 1 wherein the microcontroller generates a fourth signal if the crank speed is below said second set of limits, the bicycle is moving at a speed below said threshold value and is not accelerating, said fourth signal controlling said front and rear derailleurs in a manner whereby said bicycle is downshifted to the next lower available gear.

3. The method of claim 2 wherein the microcontroller generates a fifth signal if the crank speed is below said second set of limits, the bicycle is moving at a speed below said threshold value and is not accelerating, said fifth signal controlling said front and rear derailleurs in a manner whereby said bicycle is prevented from shifting gears.

4. The method of claim 3 wherein the microcontroller generates a sixth signal if the crank speed is greater than said second set of limits, said sixth signal controlling said front and rear derailleurs in a manner whereby said bicycle is upshifted to the next higher available gear.

5. The method of claim 4 wherein the microcontroller generates a seventh signal if the crank speed is substantially zero and the bicycle is moving at a speed below said threshold value, said seventh signal controlling said front and rear derailleurs in a manner whereby said bicycle is downshifted to the next lower available gear.

6. The method of claim 1 wherein said second electrical signal is generated directly from a sensor operatively mounted with respect to said bicycle crank.

7. Apparatus for controlling the gear ratio of a bicycle having a plurality of front chainwheels and a plurality of rear sprockets, front and rear derailleurs controlling the position of a bicycle chain on selected ones of said chainwheels and sprockets comprising:
means for generating a first electrical signal corresponding to the velocity of the bicycle;
means for generating a second electrical signal corresponding to the crank speed of said bicycle;
a microcontroller responsive to said first and second electrical signals for calculating the actual gear ratio and comparing it with preset values to see if it is within a first set of limits, if within said first set of limits the microcontroller then determining whether the crank speed is within limits, the microcontroller generating a third signal if the crank speed is below limits and the bicycle is moving at a speed above a threshold value; and
means for controlling said front and rear derailleurs in response to said third electrical control signal whereby said bicycle chain is downshifted to the next lowest gear.

8. The apparatus of claim 7 wherein said microcontroller generates a fourth signal if the crank speed is below said second set of limits, the bicycle is moving at a speed below threshold value and is not accelerating and means for coupling said fourth signal to said front and rear derailleurs whereby said bicycle is downshifted to the next lower available gear.

9. The apparatus of claim 8 wherein said microcontroller generates a fifth signal if the crank speed is below said second set of limits, the bicycle is moving at a speed below said threshold value and is accelerating, said coupling means coupling said fifth electrical signal to said front and rear derailleurs whereby said bicycle is prevented form shifting gears.

10. The apparatus of claim 9 wherein said microcontroller generates a sixth signal if the crank speed is greater than said second set of limits, said coupling means coupling said sixth signal to said front and rear derailleurs whereby said bicycle is upshifted to the next higher available gear.

11. The apparatus of claim 10 wherein said microcontroller generates a seventh signal if the crank speed is substantially zero and the bicycle is moving at a speed below said threshold value, said coupling means coupling said seventh signal to said front and rear derailleurs whereby said bicycle is downshifted to the next lower available gear.

12. The apparatus of claim 7 wherein said second electrical signal is generated directly from a sensor operatively mounted with respect to said bicycle crank.

13. Apparatus for controlling the gear ratio of a bicycle having a plurality of front chainwheels, a plurality of rear sprockets and first and second wheels, first and second pedals, front and rear derailleurs controlling the position of a bicycle chain on selected ones of said chainwheels and sprockets comprising:
sensor means operatively mounted adjacent said first wheel for generating a first electrical signal corresponding to the velocity of the bicycle;
sensor means operatively associated with said first pedal for generating a second electrical signal corresponding to the crank speed of said bicycle;
a microcontroller responsive to said first and second electrical signals for calculating the actual gear ratio and comparing it with preset values to see if ti si within a first set of limits, if within said first set of limits the microcontroller thereafter determining whether the crank speed is within a second set of limits and generating a third electrical signal if the crank speed is outside said second set of limits; and
means for controlling said front and rear derailleurs in response to said third signal to shift said bicycle chain whereby said cadence is within said second set of limits, said controlling means comprising first and second servomotors.

14. The apparatus of claim 13 wherein the third electrical signal from said microcontroller is directly connected to said first and second servomotors.

15. The apparatus of claim 14 wherein said third electrical signal comprises pulse-width modulated signals selected such that said first and second servomotors index said first and second derailleurs, respectively, in a predetermined sequential manner.

* * * * *